US008468273B2

(12) United States Patent
Adachi et al.

(10) Patent No.: US 8,468,273 B2
(45) Date of Patent: Jun. 18, 2013

(54) INFORMATION STORAGE APPARATUS, INFORMATION TRANSFER METHOD, INFORMATION TRANSFER SYSTEM, PROGRAM, AND STORAGE MEDIUM

(75) Inventors: Naohiro Adachi, Kanagawa (JP); Kenichi Satori, Tokyo (JP); Kenichi Nakanishi, Tokyo (JP); Tamaki Konno, Tokyo (JP); Junko Nagata, Tokyo (JP)

(73) Assignee: Sony Corporation, Tokyo (JP)

( * ) Notice: Subject to any disclaimer, the term of this patent is extended or adjusted under 35 U.S.C. 154(b) by 695 days.

(21) Appl. No.: 11/820,822

(22) Filed: Jun. 21, 2007

(65) Prior Publication Data
US 2008/0016291 A1 Jan. 17, 2008

(30) Foreign Application Priority Data

Jun. 30, 2006 (JP) ................. 2006-180782

(51) Int. Cl.
*G06F 3/00* (2006.01)
(52) U.S. Cl.
USPC .......................... 710/3; 710/4; 710/5; 710/14
(58) Field of Classification Search
USPC ................................. 710/14, 5, 3, 4
See application file for complete search history.

(56) References Cited

U.S. PATENT DOCUMENTS

| 5,832,492 | A  | * | 11/1998 | Wooten  ............................. 1/1 |
| 6,026,478 | A  | * | 2/2000  | Dowling  ......................... 712/24 |
| 6,178,467 | B1 | * | 1/2001  | Faucher et al.  ................... 710/4 |
| 7,379,475 | B2 | * | 5/2008  | Minami et al.  ............... 370/469 |
| 2003/0110012 | A1 | * | 6/2003 | Orenstien et al.  ............. 702/188 |
| 2004/0230734 | A1 | * | 11/2004 | Fujita et al.  ................... 710/308 |
| 2005/0215248 | A1 | * | 9/2005 | Brookshire  ................ 455/426.1 |
| 2006/0053241 | A1 | * | 3/2006 | Lin et al.  ...................... 710/301 |
| 2007/0030734 | A1 | * | 2/2007 | Sinclair et al.  ........... 365/185.11 |

FOREIGN PATENT DOCUMENTS

| JP | 11-252153 | 9/1999 |
| JP | 11-261608 | 9/1999 |
| JP | 2000-032005 | 1/2000 |
| JP | 2001-086132 | 3/2001 |
| JP | 2004-046891 | 2/2004 |
| JP | 2004-258856 | 9/2004 |

OTHER PUBLICATIONS

Nick Parlante, "Linked List Basics", Nov. 23, 2001, http://web.archive.org/web/20011123045706/http://cslibrary.stanford.edu/103/LinkedListBasics.pdf.*

* cited by examiner

*Primary Examiner* — Farley Abad
(74) *Attorney, Agent, or Firm* — Robert J. Depke; The Chicago Technology Law Group, LLC

(57) ABSTRACT

An information storage apparatus transmits or receives information to or from another information processing apparatus in one of a plurality of data transfer modes. The information storage apparatus includes first storage means for storing the information; information transmission/reception control means for controlling transmission or reception of the information between the first storage means and second storage means contained in the other information processing apparatus; command analysis means for analyzing a command supplied from the other information processing apparatus to determine which of the plurality of data transfer modes should be applied; and configuration means for configuring the information transmission/reception control means based on a result of determination of the data transfer mode by the command analysis means.

10 Claims, 14 Drawing Sheets

F I G . 5
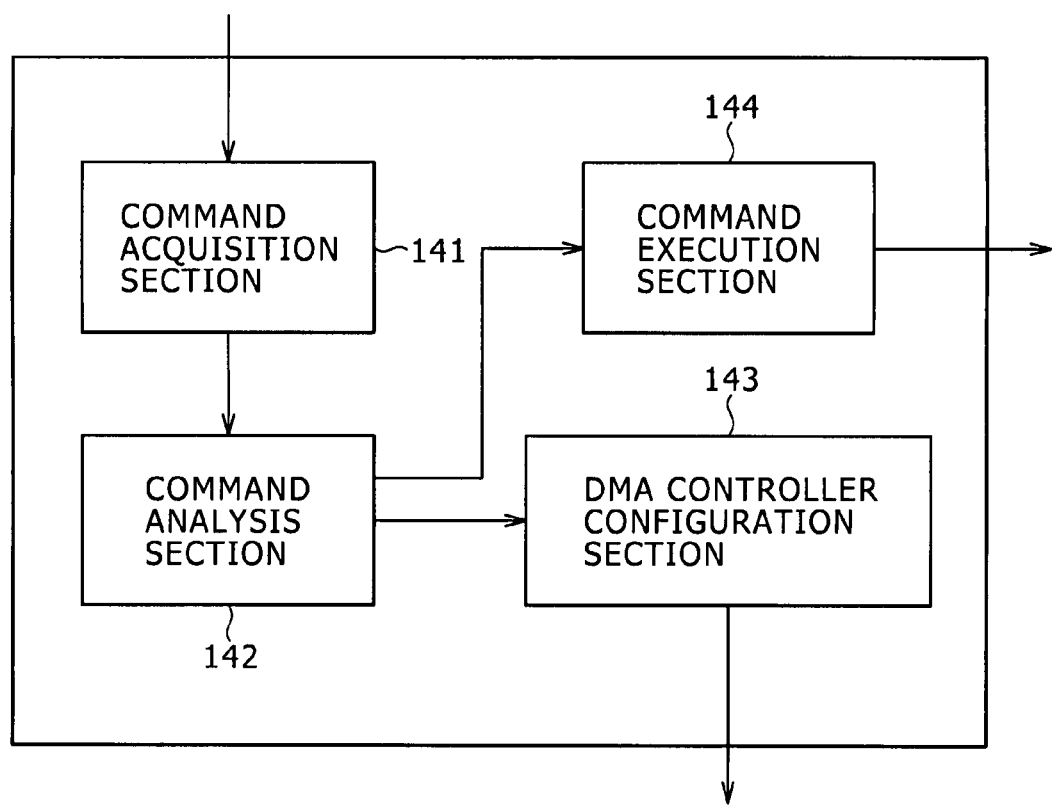

F I G . 6

| COMMAND NAME | COMMAND CODE | DESCRIPTION |
|---|---|---|
| READ_DATA_LINKLIST | xx_xxxxh | IN LINK LIST MODE, READ DATA OF SPECIFIED SIZE CONTINUOUSLY FROM SPECIFIED ADDRESS |
| WRITE_DATA_LINKLIST | xx_xxxxh | IN LINK LIST MODE, WRITE DATA OF SPECIFIED SIZE CONTINUOUSLY TO SPECIFIED ADDRESS |

FIG.7

| 31 | | | 0 |
|---|---|---|---|
| TRANSFER ADDRESS | | | |
| TRANSFER ADDRESS | | | |
| Reserved | | TRANSFER SIZE | |
| EOT | Reserved | | |

FIG. 8

| COMMAND NAME | COMMAND CODE | DESCRIPTION |
|---|---|---|
| READ_DATA_DIRECT | xx_xxxxh | IN DIRECT MODE, READ DATA OF SPECIFIED SIZE CONTINUOUSLY FROM SPECIFIED ADDRESS |
| WRITE_DATA_DIRECT | xx_xxxxh | IN DIRECT MODE, WRITE DATA OF SPECIFIED SIZE CONTINUOUSLY TO SPECIFIED ADDRESS |

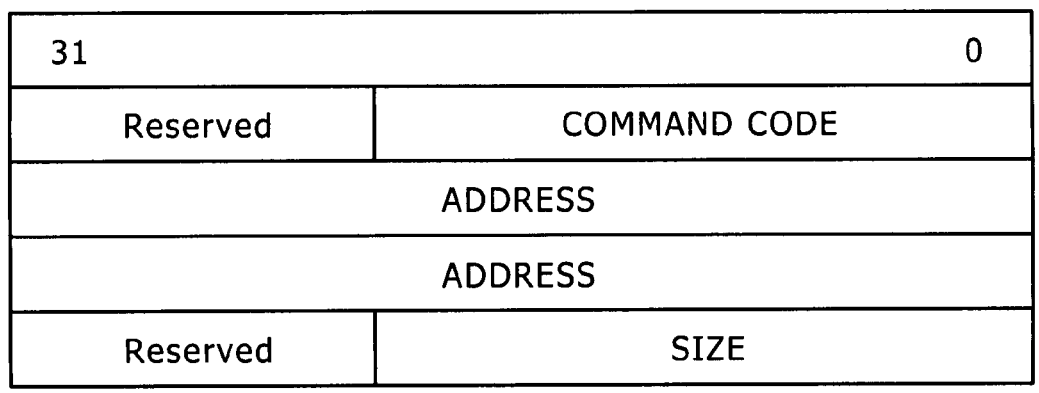
F I G . 9

FIG.10

| COMMAND NAME | COMMAND CODE | DESCRIPTION |
| --- | --- | --- |
| ERASE | xx_xxxxh | ERASE DATA OF SPECIFIED SIZE FROM SPECIFIED ADDRESS |
| CHECK_ERASED | xx_xxxxh | CHECK WHETHER DATA OF SPECIFIED SIZE HAS BEEN ERASED FROM SPECIFIED ADDRESS |
| BLANK | xx_xxxxh | INITIALIZE |

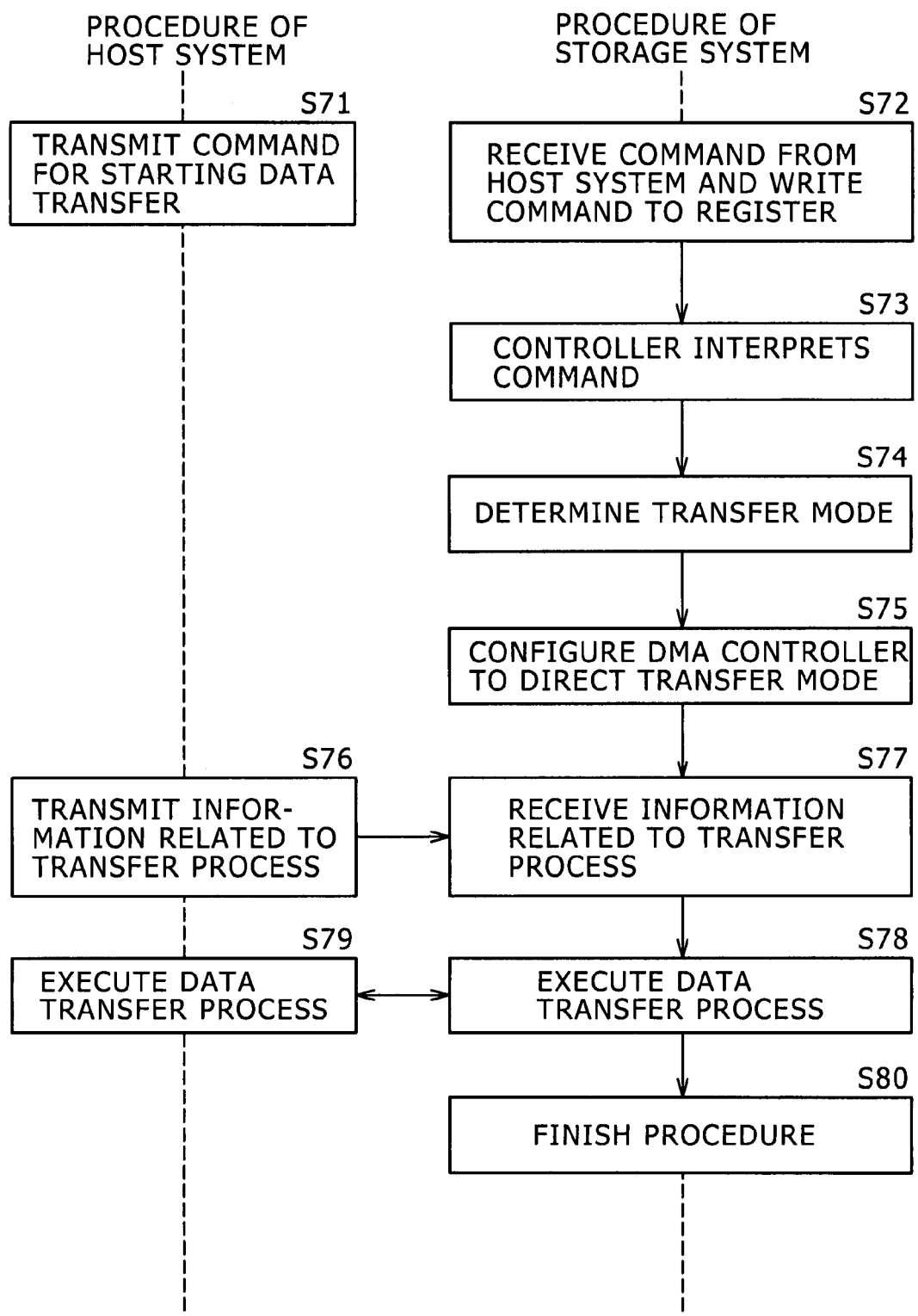

INFORMATION STORAGE APPARATUS, INFORMATION TRANSFER METHOD, INFORMATION TRANSFER SYSTEM, PROGRAM, AND STORAGE MEDIUM

CROSS REFERENCES TO RELATED APPLICATIONS

The present invention contains subject matter related to Japanese Patent Application JP 2006-180782, filed in the Japan Patent Office on Jun. 30, 2006, the entire contents of which being incorporated herein by reference.

BACKGROUND OF THE INVENTION

1. Field of the Invention

The present invention relates to an information storage apparatus, an information transfer method, an information transfer system, a program, and a storage medium. In particular, the present invention relates to an information storage apparatus, an information transfer method, an information transfer system, a program, and a storage medium, which can be used suitably for information transfer.

2. Description of the Related Art

A data processing apparatus to which a memory card or the like having a built-in memory has been used in the past (see Japanese Patent Laid-open No. 2004-46891, for example).

In the past, a direct memory access (DMA) controller has been used for data transfer between a host and a storage. Direct memory access refers to transferring data between memories or between a memory and an I/O device directly, without depending on a collection of machine language instructions. The DMA controller is a controller for controlling a DMA function.

There are two types of data transfer using the DMA function. In one type of data transfer, data is transferred using descriptors that describe data transfer control information, such as a data transfer address and a data transfer size. In the other type of data transfer, the descriptors are not used, and transfer information is directly written to a register or the like for the data transfer.

The transfer method involving the use of the descriptors is, for example, suitably used for data transfer in the case of, as in a memory system used in a personal computer or the like, a discrete physical address space managed on a page-by-page basis, i.e., in the case where pieces of information that are defined as being stored in a continuous logical address space are, in an actual physical address space, stored discretely (see FIG. 1). If the data transfer is carried out by directly writing the transfer information to the register or the like in the case as illustrated in FIG. 1, there arises a need to write the transfer information to the register at each interruption of the transfer, resulting in increased overhead in the transfer and possibly in a reduced transfer rate.

In contrast, in the case where the data transfer is carried out using the descriptors in an embedded system that is able to secure a continuous physical address space as well as the continuous logical address space, a transfer time necessary for automatically acquiring the descriptors becomes overhead in the transfer, which may result in a reduced transfer rate (see FIG. 2).

An exemplary data transfer in the related art will now be described below with reference to FIG. 3.

A host system 1 and a storage system 2 are connected to each other via a common bus 3.

A DMA controller 12 has set therein a data transfer mode, i.e., either a mode in which the data transfer is carried out using the descriptors or a mode in which the data transfer is carried out by directly writing the transfer information to the register or the like without using the descriptors.

When a data transfer instruction is accepted via an operation input section (not shown), a CPU 11 of the host system 1 supplies a command for starting DMA transfer to the DMA controller 12. Upon receipt of the command for starting the DMA transfer from the CPU 11, the DMA controller 12 acquires information concerning the data transfer based on its setting, and reads data from a storage memory 22 in the storage system 2 via an I/F 14, the common bus 3, and an I/F 23 and writes the read data to a memory 13, or performs an inverse operation. After completion of the transfer of data of a specified size, the DMA controller 12 uses an interrupt or the like to notify the CPU 11 of the completion.

As in the above example, the DMA controller 12 is generally mounted on the host system 1, and reads the data from the storage system 2 connected thereto via the common bus 3 and writes the read data to the memory 13, or performs the inverse operation, for example.

As an interface between the host system 1 and the storage system 2, a dedicated interface has been used in the past in some cases.

A high-speed bus called a Peripheral Components Interconnect (PCI) Express bus is widely used (see Japanese Patent Laid-open No. 2006-155183, for example).

SUMMARY OF THE INVENTION

As described above, the DMA transfer has the mode in which the descriptors are used and the mode in which the transfer information is directly written to the register without the use of the descriptors, and of the two modes, a proper one is adopted depending on a system.

For example, in a storage system using a removable silicon storage or the like, a host device connected to the storage system may have various system configurations. Thus, memory used for the data transfer is sometimes allocated to a certain fixed area and sometimes allocated dynamically by an operating system. As described above, in the case where the memory used for the data transfer is allocated dynamically, it is preferable that the descriptors be used. Meanwhile, in the case where the memory used for the data transfer is allocated to the fixed area, the method of directly writing the transfer information to the register is preferable to the method using the descriptors, because control is easier in the former method as there is not a need for the descriptors to be prepared in the host device.

Thus, the transfer method to be adopted in the storage system varies depending on the system configuration of the host device connected to the storage system. However, storage systems in the related art generally have a command set of only one transfer method. This sometimes causes variation in performance in the data transfer depending on the host device connected to the storage system.

There is an increasing demand for improving the speed of the data transfer as the high-speed bus, such as the PCI Express bus, is becoming more and more commercially practical as mentioned above. Thus, there is a demand for preventing the performance in the data transfer from varying widely depending on the connected host device.

Moreover, in the case of the silicon storage such as a flash memory card, for example, it is desirable that the aforementioned detailed control of DMA be hidden from a user and that an access method using a simpler command set be provided.

For example, it is conceivable that the user performs an input operation based on the connected host device or another condition, and the CPU 11 performs all detailed settings on the DMA controller 12. In this case, however, the operation is complicated, unfortunately.

The present invention has been devised in view of the above situation, and aims to enable the data transfer to be performed in a proper data transfer mode without the user having to perform a complicated operation.

According to one embodiment of the present invention, there is provided an information storage apparatus that transmits or receives information to or from another information processing apparatus in one of a plurality of data transfer modes. The information storage apparatus includes first storage means, information transmission/reception control means, command analysis means, and configuration means. The first storage means stores the information. The information transmission/reception control means controls transmission or reception of the information between the first storage means and second storage means contained in the other information processing apparatus. The command analysis means analyzes a command supplied from the other information processing apparatus to determine which of the plurality of data transfer modes should be applied. The configuration means configures the information transmission/reception control means based on a result of determination of the data transfer mode by the command analysis means.

It may be so arranged that the command analysis means is capable of analyzing a first command set, that the other information processing apparatus is either a first information processing apparatus or a second information processing apparatus, and that the first command set includes a second command set composed of commands to be supplied from the first information processing apparatus and a third command set composed of commands to be supplied from the second information processing apparatus.

Commands related to data transfer among the second command set and commands related to data transfer among the third command set may include mutually different commands for an identical process.

A part of the second command set and a part of the third command set may include an identical command.

It may be so arranged that in the second storage means contained in the first information processing apparatus that supplies the commands included in the second command set, a physical address space is of a discrete type, whereas in the second storage means contained in the second information processing apparatus that supplies the commands included in the third command set, the physical address space is of a continuous type.

According to another embodiment of the present invention, there is provided an information transfer method employed in an information storage apparatus for transmitting or receiving information to or from another information processing apparatus in one of a plurality of data transfer modes. The method includes the steps of: analyzing a command supplied from the other information processing apparatus; based on analysis of the command, determining which of the plurality of data transfer modes should be applied; and based on a result of determination of the data transfer mode, configuring an information transmission/reception control section configured to control transmission or reception of the information between a first storage section configured to store the information and a second storage section contained in the other information processing apparatus.

According to yet another embodiment of the present invention, there is provided a program for causing a computer to execute a process for controlling transmission or reception of information to or from another information processing apparatus using one of a plurality of data transfer modes. The process includes the steps of: analyzing a command supplied from the other information processing apparatus; based on analysis of the command, determining which of the plurality of data transfer modes should be applied; and based on a result of determination of the data transfer mode, configuring an information transmission/reception control section configured to control transmission or reception of the information between a first storage section configured to store the information and a second storage section contained in the other information processing apparatus.

In the above-described embodiments of the present invention, the command supplied from the other information processing apparatus is analyzed; based on the result of the analysis, it is determined which of the plurality of data transfer modes should be applied; and based on the result of the determination of the data transfer mode, the transmission or reception of the information between the first storage section configured to store the information and the second storage section contained in the other information processing apparatus is controlled.

As described above, according to the above-described embodiments of the present invention, the transmission or reception of information to or from a host apparatus is possible. In particular, a single storage apparatus is capable of transmitting or receiving information to or from different types of host apparatuses that have separate types of applicable transfer modes.

According to yet another embodiment of the present invention, there is provided an information transfer system including: an information storage apparatus that transmits or receives information to or from another information processing apparatus in one of a plurality of data transfer modes; and an information processing apparatus that transmits or receives the information to or from the information storage apparatus in one of the plurality of data transfer modes. The information storage apparatus includes first storage means, information transmission/reception control means, command analysis means, and configuration means. The first storage means stores the information. The information transmission/reception control means controls transmission or reception of the information between the first storage means and second storage means contained in the information processing apparatus. The command analysis means analyzes a command supplied from the information processing apparatus to determine which of the plurality of data transfer modes should be applied. The configuration means configures the information transmission/reception control means based on a result of determination of the data transfer mode by the command analysis means. The information processing apparatus includes: the second storage means; and command sending means for sending, to the information storage apparatus, the command that complies with one of the plurality of data transfer modes.

It may be so arranged that the command analysis means of the information storage apparatus is capable of analyzing a first command set, that the information processing apparatus is either a first information processing apparatus or a second information processing apparatus, that the first command set includes a second command set composed of commands to be supplied from the first information processing apparatus and a third command set composed of commands to be supplied from the second information processing apparatus, and that the command sent by the command sending means of the information processing apparatus is a command included in either the first command set or the second command set.

Commands related to data transfer among the second command set and commands related to data transfer among the third command set may include mutually different commands for an identical process.

A part of the second command set and a part of the third command set may include an identical command.

It may be so arranged that in the second storage means contained in the first information processing apparatus that supplies the commands included in the second command set, a physical address space is of a discrete type, whereas in the second storage means contained in the second information processing apparatus that supplies the commands included in the third command set, the physical address space is of a continuous type.

In this embodiment of the present invention, the transmission or reception of the information between the first storage means for storing the information and the second storage means contained in the information processing apparatus is controlled by the information storage apparatus. The information processing apparatus sends, to the information storage apparatus, the command that complies with one of the plurality of data transfer modes. In the information storage apparatus, the command supplied from the information processing apparatus is analyzed to determine which of the plurality of data transfer modes should be applied, and the information transmission/reception control means is configured based on the result of the determination of the data transfer mode.

According to this embodiment of the present invention, the transmission or reception of information between a host apparatus and a storage apparatus is possible. In particular, a single storage apparatus is capable of transmitting or receiving information to or from different types of host apparatuses that have separate types of applicable transfer modes.

A network refers to a system in which at least two apparatuses are connected to one another such that information can be transferred from one apparatus to another. The apparatuses that communicate with each other via the network may be either independent apparatuses or internal blocks that constitute a single apparatus.

The term "communication" naturally encompasses wireless communication and wired communication as well as a mixture of wireless and wired communications, in which the wireless communication is performed in one section while the wired communication is performed in another section. Further, while communication from one apparatus to another apparatus is performed through wire, communication from the other apparatus to the one apparatus may be performed in a wireless manner.

A recording apparatus may be either an independent apparatus or a block of a recording and playback apparatus, the block performing a recording process.

BRIEF DESCRIPTION OF THE DRAWINGS

FIG. 5 is a functional block diagram illustrating functions of a controller;

FIG. 6 is a diagram for explaining an example of a first command set;

FIG. 7 is a diagram for explaining a descriptor;

FIG. 8 is a diagram for explaining an example of a second command set;

FIG. 9 is a diagram for explaining an example of data transfer information;

FIG. 10 is a diagram for explaining examples of commands that are used both in a host system that applies a link list transfer mode and in a host system that applies a direct transfer mode;

FIG. 14 is a flowchart for explaining procedures of the host system and the storage system.

DETAILED DESCRIPTION OF THE PREFERRED EMBODIMENTS

Figure 1:
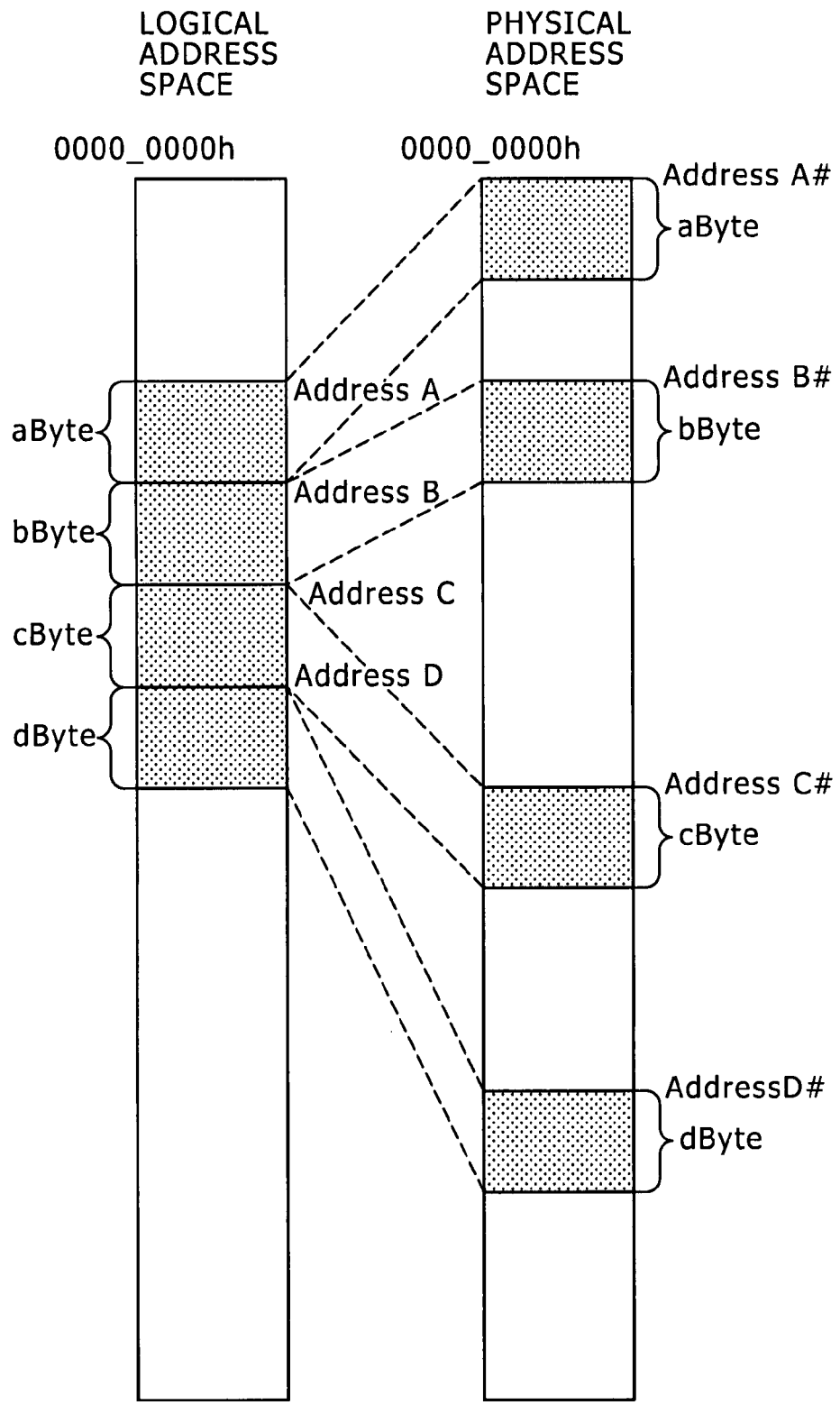
FIG. 1 is a diagram for explaining a physical address space of a discrete type.

Hereinafter, embodiments of the present invention will be described. Correspondence between the constituent features of the present invention and the embodiments that will be described below in this specification taken in conjunction with the accompanying drawings is exemplified as follows. Note that this preliminary description is meant to confirm that an embodiment that supports the present invention is described in this specification and the accompanying drawings. Therefore, even if there is an embodiment that is described in this specification and the accompanying drawings but not described in this preliminary description as corresponding to a constituent feature of the present invention, that does not mean that that embodiment does not correspond to that constituent feature. Conversely, even if a certain embodiment is described in this preliminary description as corresponding to a certain constituent feature of the present invention, that does not mean that the certain embodiment does not correspond to any other constituent feature.

An information storage apparatus according to one embodiment of the present invention is an information storage apparatus (e.g., a storage system 61 in FIG. 4) that transmits or receives information to or from another information processing apparatus (e.g., a host system 62 in FIG. 4) in one of a plurality of data transfer modes (e.g., a link list transfer mode and a direct transfer mode), the information storage apparatus including: first storage means (e.g., a buffer memory 85 or a storage memory 88 in FIG. 4) for storing the information; information transmission/reception control means (e.g., a DMA controller 84 in FIG. 4) for controlling transmission or reception of the information between the first storage means and second storage means (e.g., a host memory 92 in FIG. 4) contained in the other information processing apparatus; command analysis means (e.g., a command analysis section 142 in FIG. 5) for analyzing a command supplied from the other information processing apparatus to determine which of the plurality of data transfer modes should be applied; and configuration means (e.g., a DMA controller configuration section 143 in FIG. 5) for configuring the information transmission/reception control means based on a result of determination of the data transfer mode by the command analysis means.

Commands related to data transfer (e.g., a READ_DATA_LINKLIST command and a WRITE_DATA_LINKLIST command in FIG. 6) among the second command set and commands related to data transfer (e.g., a READ_DATA_DIRECT command and a WRITE_DATA_DIRECT command in FIG. 8) among the third command set may include mutually different commands for an identical process.

A part of the second command set and a part of the third command set may include an identical command (e.g., an ERASE command, a CHECK_ERASED command, and a BLANK command in FIG. 10).

An information transfer method according to one embodiment of the present invention is an information transfer method employed in an information storage apparatus (e.g., the storage system 61 in FIG. 4) for transmitting or receiving information to or from another information processing apparatus (e.g., the host system 62 in FIG. 4) in one of a plurality of data transfer modes (e.g., the link list transfer mode and the direct transfer mode). The method includes the steps of: analyzing a command supplied from the other information processing apparatus (e.g., a process of step S2 in FIG. 12); based on analysis of the command, determining which of the plurality of data transfer modes should be applied (e.g., a process of step S5 in FIG. 12); and based on a result of determination of the data transfer mode, configuring an information transmission/reception control section (e.g., the DMA controller 84 in FIG. 4) configured to control transmission or reception of the information between a first storage section (e.g., the buffer memory 85 or the storage memory 88 in FIG. 4) configured to store the information and a second storage section (e.g., the host memory 92 in FIG. 4) contained in the other information processing apparatus (e.g., a process of step S6 in FIG. 12).

A program according to one embodiment of the present invention is a program for causing a computer to execute a process for controlling transmission or reception of information to or from another information processing apparatus (e.g., the host system 62 in FIG. 4) using one of a plurality of data transfer modes (e.g., the link list transfer mode and the direct transfer mode). The process includes the steps of: analyzing a command supplied from the other information processing apparatus (e.g., the process of step S2 in FIG. 12); based on analysis of the command, determining which of the plurality of data transfer modes should be applied (e.g., the process of step S5 in FIG. 12); and based on a result of determination of the data transfer mode, configuring an information transmission/reception control section (e.g., the DMA controller 84 in FIG. 4) configured to control transmission or reception of the information between a first storage section (e.g., the buffer memory 85 or the storage memory 88 in FIG. 4) configured to store the information and a second storage section (e.g., the host memory 92 in FIG. 4) contained in the other information processing apparatus (e.g., the process of step S6 in FIG. 12).

An information transfer system according to one embodiment of the present invention is an information transfer system including: an information storage apparatus (e.g., the storage system 61 in FIG. 4) that transmits or receives information to or from another information processing apparatus (e.g., the host system 62 in FIG. 4) in one of a plurality of data transfer modes (e.g., the link list transfer mode and the direct transfer mode); and an information processing apparatus (e.g., the host system 62 in FIG. 4) that transmits or receives the information to or from the information storage apparatus in one of the plurality of data transfer modes. The information storage apparatus includes: first storage means (e.g., the buffer memory 85 or the storage memory 88 in FIG. 4) for storing the information; information transmission/reception control means (e.g., the DMA controller 84 in FIG. 4) for controlling transmission or reception of the information between the first storage means and second storage means (e.g., the host memory 92 in FIG. 4) contained in the information processing apparatus; command analysis means (e.g., the command analysis section 142 in FIG. 5) for analyzing a command supplied from the information processing apparatus to determine which of the plurality of data transfer modes should be applied; and configuration means (e.g., the DMA controller configuration section 143 in FIG. 5) for configuring the information transmission/reception control means based on a result of determination of the data transfer mode by the command analysis means. The information processing apparatus includes: the second storage means; and command sending means (e.g., a host CPU 91 in FIG. 4) for sending, to the information storage apparatus, the command that complies with one of the plurality of data transfer modes.

Commands related to data transfer (e.g., the READ_DATA_LINKLIST command and the WRITE_DATA_LINKLIST command in FIG. 6) among the second command set and commands related to data transfer (e.g., the READ_DATA_DIRECT command and the WRITE_DATA_DIRECT command in FIG. 8) among the third command set may include mutually different commands for an identical process.

A part of the second command set and a part of the third command set may include an identical command (e.g., the ERASE command, the CHECK_ERASED command, and the BLANK command in FIG. 10).

Hereinafter, an embodiment of the present invention will be described with reference to the accompanying drawings.

Figure 4:
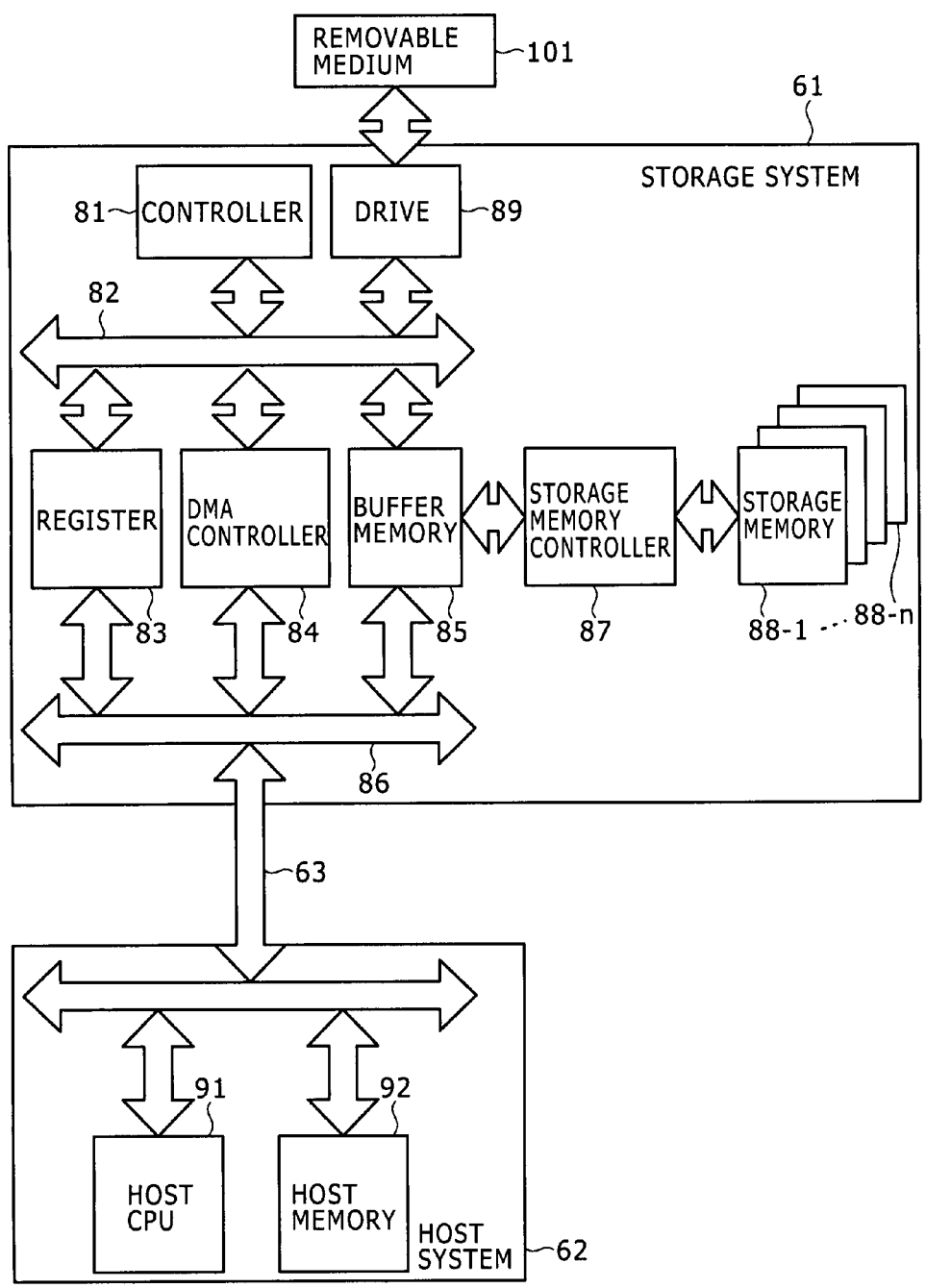
FIG. 4 is a block diagram illustrating a host system and a storage system according to one embodiment of the present invention.

FIG. 4 is a block diagram illustrating a storage system 61 and a host system 62 according to one embodiment of the present invention.

The storage system 61 and the host system 62 are connected to each other via a storage I/F 63. As the storage I/F 63, a high-speed bus, such as a Peripheral Components Interconnect (PCI) Express bus, is used preferably, for example.

The storage system 61 includes a controller 81, an internal bus 82, a register 83, a DMA controller 84, a buffer memory 85, a storage I/F bus 86, a storage memory controller 87, storage memories 88-1 to 88-n, and a drive 89.

The controller 81 controls an operation of the storage system 61. For example, the controller 81 controls the storage memory controller 87 to write data to the storage memories 88-1 to 88-n or read data therefrom. For example, the controller 81 also configures the DMA controller 84 based on a command supplied from the host system 62 and written to the register 83.

The controller 81, the register 83, the DMA controller 84, and the buffer memory 85 are connected to the internal bus 82. The drive 89 is also connected to the internal bus 82 as necessary.

The register 83 may include a plurality of registers. The register 83 holds information, an argument, or the like necessary for transfer or other processes, or a descriptor or the command supplied from the host system 62 via the storage I/F 63 and the storage I/F bus 86.

The DMA controller 84 controls transmission or reception of data between the buffer memory 85 of the storage system 61 and a host memory 92 of the host system 62. The DMA controller 84 has two types of operation modes, and the operation mode of the DMA controller 84 is set by the controller 81.

The two types of operation modes are a link list transfer mode and a direct transfer mode. In the link list transfer mode, an address of a link list composed of a plurality of descriptors (also referred to as "entries") is supplied from the host system 62 to the register 83 of the storage system 61, and the storage system 61 reads this link list to perform the transfer process. In the direct transfer mode, without the use of the link list, information concerning data transfer is supplied from the host system 62 and written to the register 83 of the storage system 61 directly.

As described above with reference to FIG. 1, the link list transfer mode is preferably used in the case where a physical address space in the host memory 92 of the host system 62 is managed on a page-by-page basis, i.e., in the case where the physical address space in the host memory 92 of the host system 62 is not of a continuous type as is a logical address space but of a discrete type. In contrast, in the case where the physical address space in the host memory 92 of the host system 62 is of the continuous type as is the logical address space as described above with reference to FIG. 2, the direct transfer mode, involving easier control, is used preferably.

The buffer memory 85 temporarily buffers data supplied from the host system 62 via the storage I/F 63 and the storage I/F bus 86, or data read from any of the storage memories 88-1 to 88-n under control of the storage memory controller 87 and to be supplied to the host system 62 via the storage I/F bus 86 and the storage I/F 63.

The storage I/F bus 86 is a bus that connects the register 83, the DMA controller 84, the buffer memory 85, and the storage I/F 63 to one another.

Under control of the controller 81, the storage memory controller 87 controls writing of the data to and reading of the data from the storage memories 88-1 to 88-n.

The data is written to and read from the storage memories 88-1 to 88-n by the storage memory controller 87.

In the following description, the storage memories 88-1 to 88-n will be simply referred to as the "storage memory 88" unless they have to be referred to individually.

The drive 89 is connected to the internal bus 82 as necessary. When a removable medium 101, such as a magnetic disk, an optical disk, a magneto-optical disk, a semiconductor memory, or the like, is mounted on the drive 89, the drive 89 drives the removable medium 101 to acquire a program or data recorded thereon. The program or data acquired is transferred to the storage memory 88 and recorded thereon or installed into the controller 81.

The host system 62 includes a host CPU 91 and the host memory 92. Needless to say, the host system 62 may also include other components, such as a communication section, a display section, an operation input section, an image pickup section, an audio acquisition section, a data compression section, or the like. As the host system 62, various information processing apparatuses can be used, such as a general personal computer, a digital still camera, a digital video camera, etc.

The host CPU 91 controls an operation of the host system 62. For example, based on a user's input operation via the operation input section (not shown), the host CPU 91 is capable of generating a command concerning the transmission or reception of the data to or from the storage system 61 or a command for controlling the storage memory 88, and writing the generated command to the register 83 of the storage system 61 via the storage I/F 63. Examples of the command concerning the transmission or reception of the data to or from the storage system 61 include: a command for writing the data stored in the host memory 92 to the storage memory 88 of the storage system 61; and a command for reading the data from the storage memory 88 of the storage system 61 and storing the read data in the host memory 92. Examples of the command for controlling the storage memory 88 include a command for erasing the data stored in the storage memory 88.

Under control of the host CPU 91, the host memory 92 stores specified data therein.

As described above, in the configuration of the storage system 61 and the host system 62 as illustrated in FIG. 4, the DMA controller for controlling DMA transfer is provided not on the host side as in the related art but on the storage side.

It is assumed here that there are two types of data storage formats as the data storage format of the host memory 92, i.e., a first data storage format and a second data storage format. In the first data storage format, the physical address space in the host memory 92 of the host system 62 is not of the continuous type as is the logical address space but of the discrete type (see FIG. 1). In the second data storage format, the physical address space in the host memory 92 of the host system 62 is of the continuous type as is the logical address space (see FIG. 2). In other words, as the host system 62, there are a first host system 62 in which the physical address space of the host memory 92 is composed of discontinuous (i.e., discrete) areas while the logical address space is composed of a continuous area, and a second host system 62 in which both the physical address space and the logical address space of the host memory 92 are composed of a continuous area.

That is, in the first host system 62, the aforementioned link list transfer mode is applied to perform the data transfer with the storage system 61, whereas in the second host system 62, the aforementioned direct transfer mode is applied to perform the data transfer with the storage system 61. A command set possessed by the first host system 62 that applies the link list transfer mode and a command set possessed by the second host system 62 that applies the direct transfer mode are different from each other at least in a command related to the data transfer. Details of the command sets will be described later.

Next, the operations of the storage system 61 and the host system 62 will now be described below.

For example, in the case where a process of writing the data recorded on the host memory 92 of the host system 62 to the storage memory 88 of the storage system 61 is to be performed, the host CPU 91 of the host system 62 transmits a write command to the register 83 via the storage I/F 63 and the storage I/F bus 86. The write command is a command for writing the data recorded on the host memory 92 of the host system 62 to the storage memory 88 of the storage system 61. The register 83 receives and temporarily holds this command.

The controller 81 of the storage system 61 acquires the command held in the register 83, and interprets a content of the command. Because the data transfer is performed between the storage system 61 and the host system 62 applying either the link list transfer mode or the direct transfer mode as described above, the controller 81 configures the DMA controller 84 based on the applied transfer mode.

Specifically, in the case where the applied data transfer mode is the link list transfer mode, the host CPU 91 of the host system 62 writes an address at which the link list is stored in the host memory 92 to the register 83, and accordingly, the DMA controller 84 refers to the register 83 to read one entry from the host memory 92 and executes a data transfer process based on the read entry, and, by repeating similar processes, executes data transfer processes with respect to all entries in the link list. Meanwhile, in the case where the applied data transfer mode is the direct transfer mode, the host CPU 91 of the host system 62 directly writes data transfer information, such as a data size and a data address, to the register 83, and accordingly, the DMA controller 84 refers to the register 83 to execute the data transfer process.

Specifically, in the case where data is read from the host system 62 and written to the storage system 61, the DMA controller 84 reads, out of the data recorded on the host memory 92, the data to be written to the storage memory 88 and supplies the read data to the buffer memory 85 via the storage I/F 63 and the storage I/F bus 86, so that the buffer memory 85 buffers the supplied data.

When a content of the data stored in the buffer memory 85 has become effective, writing of the data stored in the buffer memory 85 to the storage memory 88 is started by the storage memory controller 87.

Meanwhile, for example, in the case where a process of reading data from the storage memory 88 of the storage system 61 and storing the read data in the host memory 92 of the host system 62 is to be performed, the host CPU 91 of the host system 62 transmits a read command to the register 83 via the storage I/F 63 and the storage I/F bus 86. The read command is a command for reading the data from the storage memory 88 of the storage system 61. The register 83 receives and temporarily holds this command.

The controller 81 of the storage system 61 acquires the command held in the register 83, and interprets a content of the command. Because the data transfer is performed between the storage system 61 and the host system 62 applying either the link list transfer mode or the direct transfer mode as described above, the controller 81 configures the DMA controller 84 based on the applied transfer mode.

Then, in the case where the host system 62 reads the data from the storage system 61, the controller 81 controls the storage memory controller 87 to transfer the data to be read from the storage memory 88 to the buffer memory 85. When a content of the data stored in the buffer memory 85 has become effective, transfer of the data stored in the buffer memory 85 to the host memory 92 via the storage I/F bus 86 and the storage I/F 63 is started by the DMA controller 84.

FIG. 5 is a functional block diagram illustrating functions of the controller 81 of the storage system 61.

A command acquisition section 141 acquires the command supplied from the host system 62 and stored in the register 83, and supplies the acquired command to a command analysis section 142.

The command analysis section 142 analyzes the command acquired by the command acquisition section 141.

Based on a result of analysis of the command by the command analysis section 142, a DMA controller configuration section 143 configures the DMA controller 84 to either the link list transfer mode or the direct transfer mode.

As described above, the DMA controller 84 of the storage system 61 has the two transfer modes, i.e., the link list transfer mode and the direct transfer mode.

That is, the command analysis section 142 of the controller 81 is capable of identifying the two types of command sets transmitted from the host system 62 to the storage system 61, whereas the DMA controller configuration section 143 is capable of configuring the DMA controller 84 to operate in the link list transfer mode or the direct transfer mode in accordance with the command set.

Based on the result of the analysis of the command by the command analysis section 142, a command execution section 144 controls execution of a process corresponding to the command.

FIG. 6 illustrates an example of a first command set related to the data transfer possessed by the first host system 62, in which the physical address space of the host memory 92 is composed of discontinuous (i.e., discrete) areas while the logical address space is composed of a continuous area as described above with reference to FIG. 1.

A READ_DATA_LINKLIST command is a command for reading, in the link list transfer mode, data of a specified size continuously from a specified address.

A WRITE_DATA_LINKLIST command is a command for writing, in the link list transfer mode, data of a specified size continuously to a specified address.

In the link list transfer mode, a link list using a plurality of descriptors in a format as illustrated in FIG. 7 is used for writing the data to the discrete physical address space or reading the data from the discrete physical address space. The individual descriptors constituting this link list are also referred to as "entries".

Each entry includes, at least, a transfer address, a transfer size, and transfer control information (EOT) that indicates whether the entry is the last entry in the link list. In the link list transfer mode, which is a transfer mode employing the link list, the host system 62 sets, in the register 83 of the storage system 61, a top address of an area in the host memory 92 where the link list is stored. In accordance with this setting, the DMA controller 84 reads a first entry from the host memory 92. Based on transfer information described in this entry, the DMA controller 84 is able to perform necessary transfer. After the transfer using the first entry is completed, the DMA controller 84 automatically acquires the next entry from the link list, and performs transfer in a similar manner. The DMA controller 84 refers to an EOT flag of the transfer control information in the entry to determine whether this entry is the last entry. The DMA controller 84 repeats this operation until the last entry.

The link list transfer mode is applied when the transfer is performed for the discontinuous physical address space as described above with reference to FIG. 1. That is, the link list transfer mode is suitably used when the physical address space in the host memory 92 of the host system 62 is not of the continuous type as is the logical address space but of the discrete type as illustrated in FIG. 1. In other words, in the case where the physical address space in the host memory 92 of the host system 62 is not of the continuous type as is the logical address space but of the discrete type as illustrated in FIG. 1, a command set related to the data transfer possessed by the host system 62 have to be the one as illustrated in FIG. 6, and the host system 62 do not have to have a command set as described below with reference to FIG. 8.

FIG. 8 illustrates an example of a second command set related to the data transfer possessed by the second host system 62, in which the physical address space of the host memory 92 is of the continuous type as is the logical address space as described above with reference to FIG. 2.

A READ_DATA_DIRECT command is a command for reading, in the direct transfer mode, data of a specified size continuously from a specified address.

A WRITE_DATA_DIRECT command is a command for writing, in the direct transfer mode, data of a specified size continuously to a specified address.

Then, in the direct transfer mode, the host CPU 91 directly sets the data transfer information in the register 83 via the storage I/F 63.

The data transfer information directly set in the register 83 includes, as illustrated in FIG. 9, information basically equal to the descriptor, i.e., a transfer address and a transfer size. Because the data transfer information is supplied from the host CPU 91 to the register 83 via the storage I/F 63, the DMA controller 84 performs the data transfer based on this information set in the register 83. In the case where the host system 62 has further data to be transmitted to or received from the storage system 61, the host system 62 further generates the READ_DATA_DIRECT command or the WRITE_DATA_DIRECT command to notify the storage system 61 of the next transfer information, so that a similar transfer process is performed.

Figure 2:
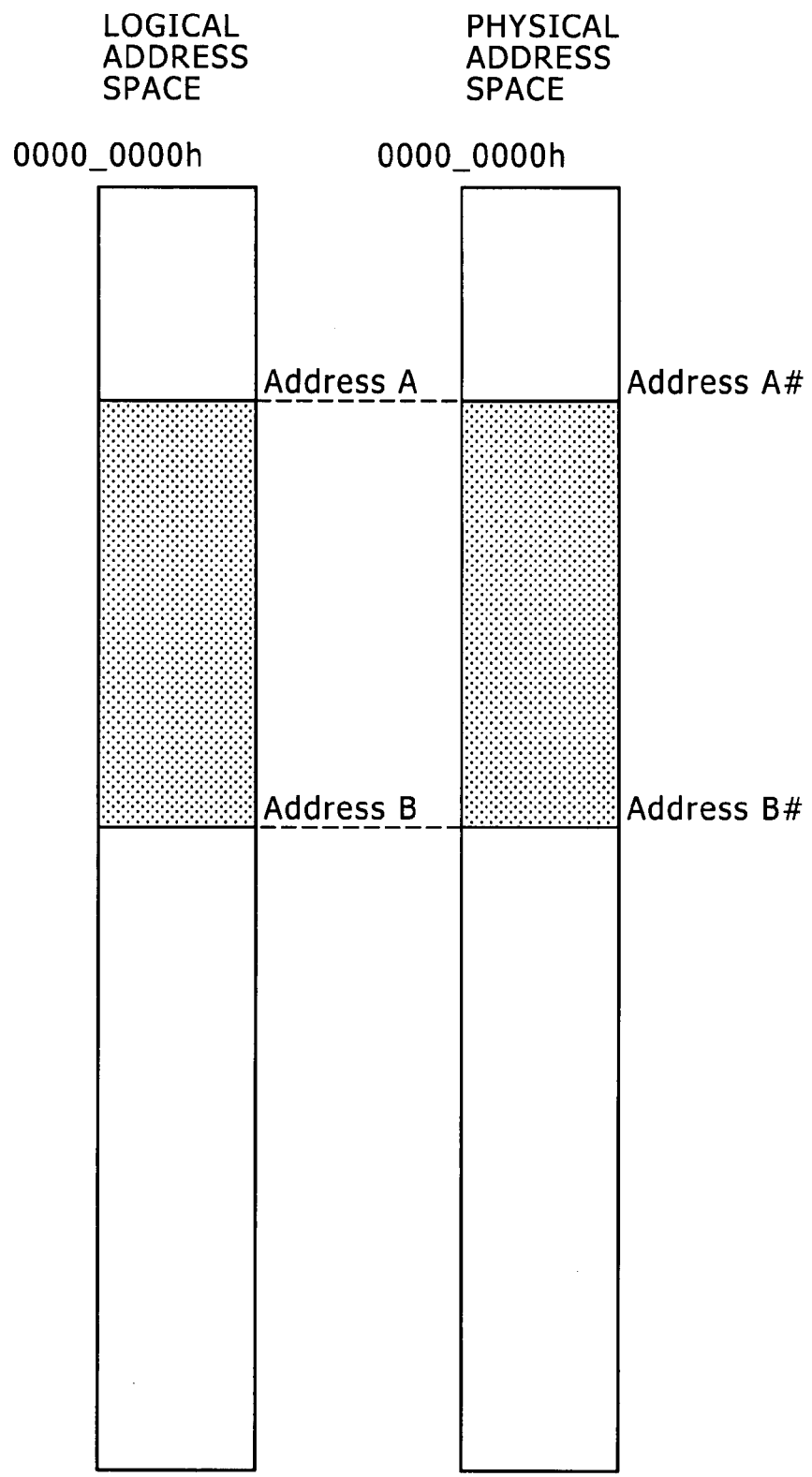
FIG. 2 is a diagram for explaining a physical address space of a continuous type.
Figure 3:
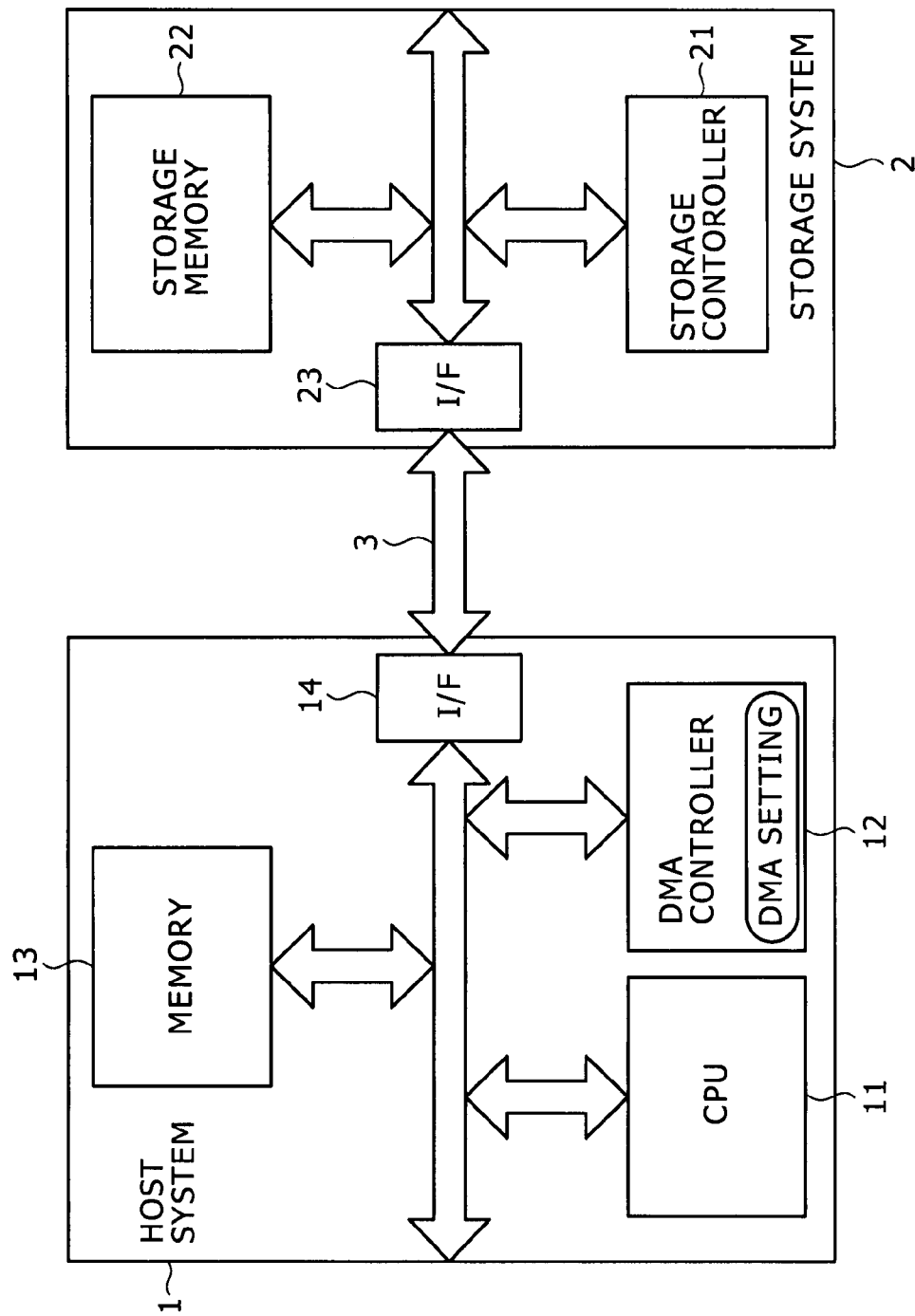
FIG. 3 is a block diagram illustrating a host system and a storage system in the related art.

The direct transfer mode is applied when the transfer is performed for the continuous physical address space as described above with reference to FIG. 2. That is, the direct transfer mode is suitably used when the physical address space in the host memory 92 of the host system 62 is of the continuous type as is the logical address space as described above with reference to FIG. 2. In other words, in the case where the physical address space in the host memory 92 of the host system 62 is of the continuous type as illustrated in FIG. 2, a command set related to the data transfer possessed by the host system 62 have to be the one as illustrated in FIG. 8, and the host system 62 do not have to have the command set as illustrated in FIG. 6.

As for a command for a process that is not affected by whether the physical address space in the host memory 92 of the host system 62 is not of the continuous type as is the logical address space but of the discrete type as described above with reference to FIG. 1 or whether the physical address space in the host memory 92 of the host system 62 is of the continuous type as is the logical address space as described above with reference to FIG. 2, an identical command can be issued both in the host system 62 that applies the link list transfer mode as the data transfer mode and in the host system 62 that applies the direct transfer mode as the data transfer mode.

For example, referring to FIG. 10, as for an ERASE command for erasing data of a specified size from a specified address, a CHECK_ERASED command for checking whether data of a specified size has been erased from a specified address, a BLANK command for initialization, or the like, an identical command can be used regardless of a state of the host memory 92 of the host system 62.

Figure 11:
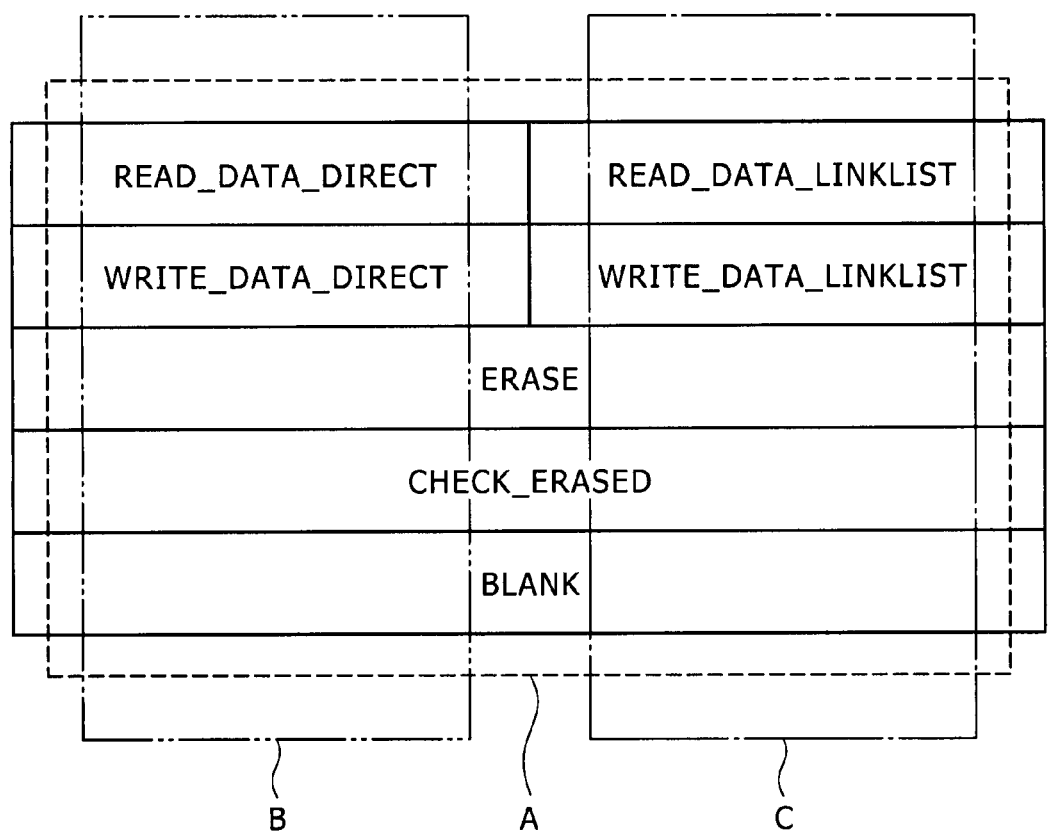
FIG. 11 is a diagram for explaining a command set that can be recognized by the storage system, a command set that can be recognized by a first host system in which the physical address space is of the discrete type, and a command set that can be recognized by a second host system in which the physical address space is of the continuous type.

Referring to FIG. 11, a command set that can be recognized by the storage system 61, a command set that can be recognized by the first host system 62 in which the physical address space is composed of discontinuous (i.e., discrete) areas while the logical address space is composed of a continuous area, and a command set that can be recognized by the second host system 62 in which both the physical address space and the logical address space are composed of a continuous area will now be described below.

A first command set that can be recognized by the first host system 62 in which the physical address space is composed of discontinuous (i.e., discrete) areas while the logical address space is composed of a continuous area is composed of the READ_DATA_LINKLIST command, the WRITE_DATA_LINKLIST command, the ERASE command, the CHECK_ERASED command, and the BLANK command as indicated by C in FIG. 11. A second command set that can be recognized by the second host system 62 in which both the physical address space and the logical address space are composed of a continuous area is composed of the READ_DATA_DIRECT command, the WRITE_DATA_DIRECT command, the ERASE command, the CHECK_ERASED command, and the BLANK command as indicated by B in FIG. 11. Meanwhile, the command set that can be recognized by the storage system 61 is a command set indicated by A in FIG. 11, which includes the first command set indicated by C in FIG. 11 and the second command set indicated by B in FIG. 11. That is, the commands that can be recognized by the storage system 61 are the READ_DATA_LINKLIST command, the WRITE_DATA_LINKLIST command, the ERASE command, the READ_DATA_DIRECT command, the WRITE_DATA_DIRECT command, the CHECK_ERASED command, and the BLANK command.

In other words, the command set that can be recognized by the storage system 61 is the two types of command sets, i.e., the first command set that can be recognized by the first host system 62 in which the physical address space is composed of discontinuous (i.e., discrete) areas while the logical address space is composed of a continuous area and the second command set that can be recognized by the second host system 62 in which both the physical address space and the logical address space are composed of a continuous area.

Note that two types of commands (i.e., the read command and the write command) are defined in the present embodiment. However, the number of commands defined in the first command set that can be recognized by the first host system 62 and in the second command set that can be recognized by the second host system 62 is not restricted. The number of commands that are defined in each command set may be one or multiple.

Figure 12:
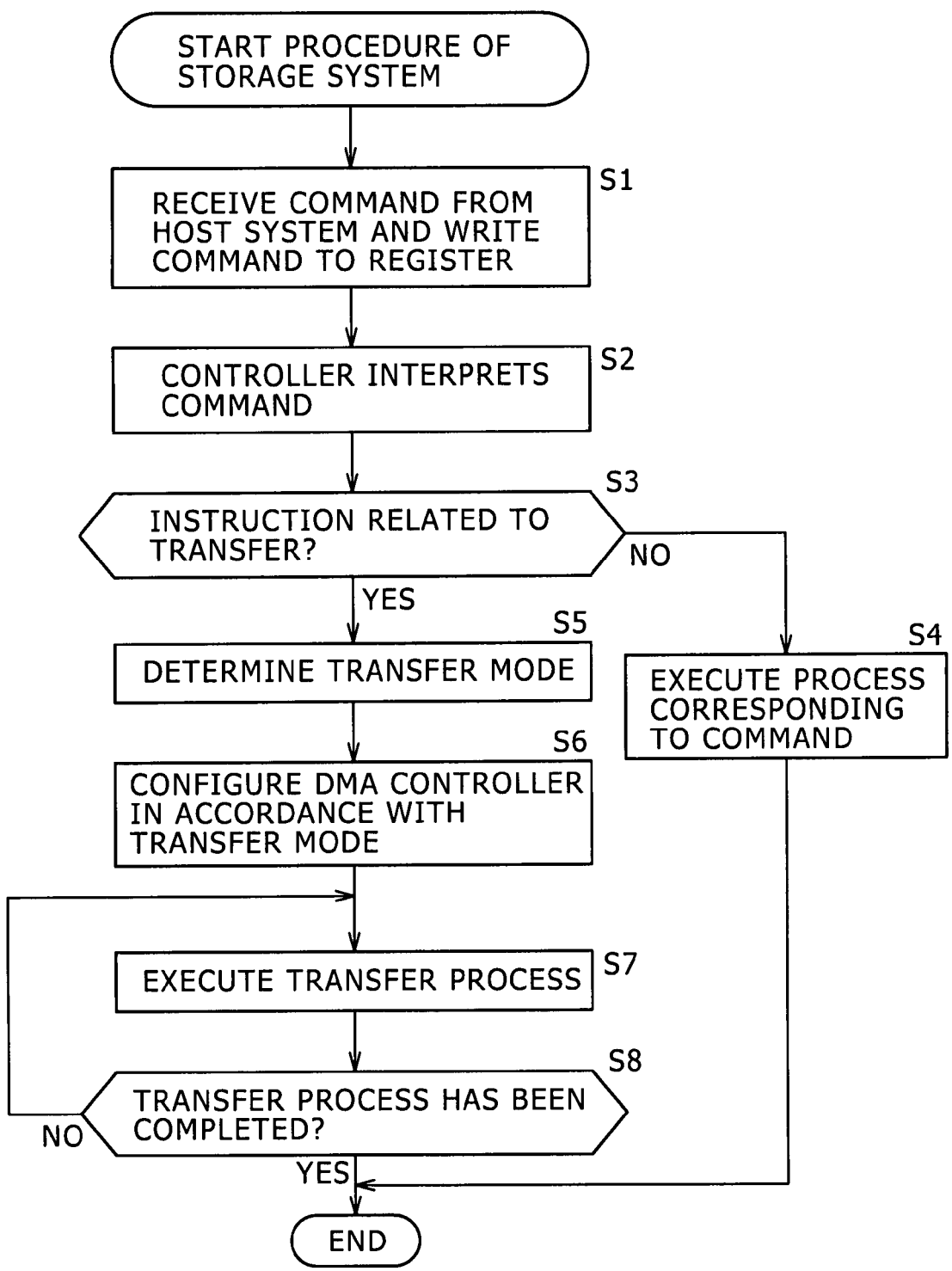
FIG. 12 is a flowchart for explaining a procedure of the storage system.

Next, a procedure of the storage system 61 will now be described below with reference to a flowchart of FIG. 12.

At step S1, the storage system 61 receives the command from the host system 62 via the storage I/F 63. The command received is written to the register 83 via the storage I/F bus 86.

At step S2, the command acquisition section 141 of the controller 81 reads the command written to the register 83 via the internal bus 82, and the command analysis section 142 of the controller 81 interprets the command.

At step S3, the command analysis section 142 of the controller 81 determines whether the command written to the register 83 is an instruction related to data transfer (i.e., writing or reading).

If it is determined at step S3 that the command is not the instruction related to the data transfer, i.e., in the case where the command written to the register 83 is any of the commands as described above with reference to FIG. 10, the command execution section 144 of the controller 81 executes a process corresponding to the command at step S4. Then, this procedure is finished.

If it is determined at step S3 that the command is the instruction related to the data transfer, the command analysis section 142 of the controller 81, at step S5, determines the transfer mode based on the type of the command, i.e., based on whether the command written to the register 83 is any of the commands as described above with reference to FIG. 6 or any of the commands as described above with reference to FIG. 8. Specifically, in the case where the command written to the register 83 is any of the commands as described above with reference to FIG. 6, the command analysis section 142 determines that the data transfer mode is the link list transfer mode. Meanwhile, in the case where the command written to the register 83 is any of the commands as described above with reference to FIG. 8, the command analysis section 142 determines that the data transfer mode is the direct transfer mode.

At step S6, the DMA controller configuration section 143 of the controller 81 configures the DMA controller 84 in accordance with the transfer mode.

At step S7, the command execution section 144 of the controller 81 and the DMA controller 84 execute the data transfer process. Details of the process in the link list transfer mode and in the direct transfer mode will be described later with reference to FIGS. 13 and 14, respectively.

At step S8, the command execution section 144 of the controller 81 determines whether the transfer process has been completed. If it is determined at step S8 that the transfer process has not been completed, control returns to step S7. Meanwhile, if it is determined at step S8 that the transfer process has been completed, this procedure is finished.

By the above procedure, the controller 81 of the storage system 61 is able to determine the data transfer mode based on the command supplied from the host system 62 and to configure the DMA controller 84 in accordance with the data transfer mode. Therefore, the storage system 61 is able to execute the data transfer process in a proper manner regardless of whether the format of the host memory 92 of the host system 62 is such that the physical address space is of the discrete type while the logical address space is of the continuous type as described above with reference to FIG. 1 (i.e., in the case of the first host system 62 as described above) or such that both the physical address space and the logical address space are of the continuous type as described above with reference to FIG. 2 (i.e., in the case of the second host system 62 as described above).

Figure 13:
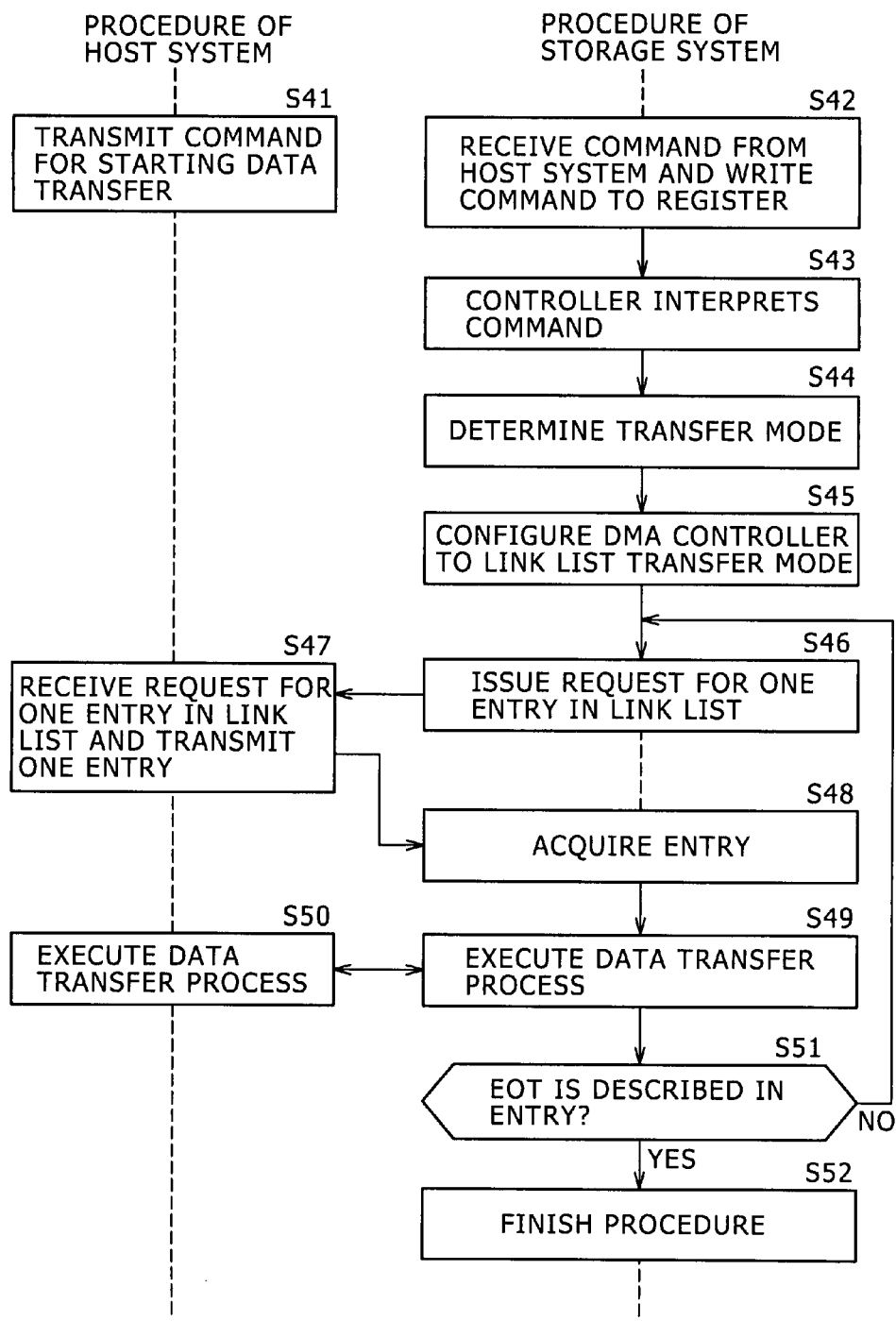
FIG. 13 is a flowchart for explaining procedures of the host system and the storage system.

Next, with reference to a flowchart of FIG. 13, procedures of the host system 62 and the storage system 61 in the link list transfer mode will now be described below.

At step S41, the host CPU 91 of the host system 62 transmits a command for starting the data transfer (here, any of the commands as described above with reference to FIG. 6) to the storage system 61 via the storage I/F 63.

At step S42, the storage system 61 receives the command from the host system 62 via the storage I/F 63. The command received is written to the register 83 via the storage I/F bus 86.

At step S43, the command acquisition section 141 of the controller 81 reads the command written to the register 83 via the internal bus 82, and the command analysis section 142 of the controller 81 interprets the command.

At step S44, the command analysis section 142 of the controller 81 determines the transfer mode based on the type of the command, i.e., based on whether the command written to the register 83 is any of the commands as described above with reference to FIG. 6 or any of the commands as described above with reference to FIG. 8. Because, here, the command written to the register 83 is any of the commands as described above with reference to FIG. 6, it is assumed that the command analysis section 142 determines that the data transfer mode is the link list transfer mode.

At step S45, the DMA controller configuration section 143 of the controller 81 configures the DMA controller 84 to the link list transfer mode.

At step S46, the DMA controller 84 configured to the link list transfer mode issues a request for one entry among the link list to the host system 62 via the storage I/F 63.

At step S47, the host CPU 91 of the host system 62 receives the request for one entry among the link list, and transmits the one entry among the link list to the storage system 61 via the storage I/F 63.

At step S48, the storage system 61 acquires the entry from the host system 62 via the storage I/F 63, and holds the acquired entry in the register 83.

At step S49 and step S50, the storage system 61 and the host system 62 execute the data transfer process.

Specifically, since the host CPU 91 of the host system 62 writes, to the register 83, the address in the host memory 92 at which the link list is stored, the DMA controller 84 refers to the register 83 to read the one entry from the host memory 92, and executes the data transfer process based on the read entry.

Note that a similar data transfer process will be executed in each subsequent iteration, until the data transfer processes for all the entries in the link list are completed.

For example, in the case where the data is read from the host system 62 and written to the storage system 61, the DMA controller 84 reads, of the data recorded on the host memory 92, the data to be written to the storage memory 88, and supplies the read data to the buffer memory 85 via the storage I/F 63 and the storage I/F bus 86, so that the buffer memory 85 buffers the supplied data.

Then, when the content of the data stored in the buffer memory 85 has become effective, the writing of the data stored in the buffer memory 85 to the storage memory 88 is started by the storage memory controller 87, so that the data is stored in the storage memory 88.

At step S51, the command execution section 144 of the controller 81 of the storage system 61 determines whether the EOT is described in the entry acquired at step S48. If it is determined at step S51 that the EOT is not described in the entry, control returns to step S46 and the subsequent steps are repeated.

If it is determined at step S51 that the EOT is described in the entry, the command execution section 144 of the controller 81 finishes the procedure at step S52.

The data transfer in the link list transfer mode is performed in accordance with the above procedure.

Next, with reference to a flowchart of FIG. 14, procedures of the host system 62 and the storage system 61 in the direct transfer mode will now be described below.

At step S71, the host CPU 91 of the host system 62 transmits a command for starting the data transfer (here, any of the commands as described above with reference to FIG. 8) to the storage system 61 via the storage I/F 63.

At step S72, the storage system 61 receives the command from the host system 62 via the storage I/F 63. The command received is written to the register 83 via the storage I/F bus 86.

At step S73, the command acquisition section 141 of the controller 81 reads the command written to the register 83 via the internal bus 82, and the command analysis section 142 of the controller 81 interprets the command.

At step S74, the command analysis section 142 of the controller 81 determines the transfer mode based on the type of the command, i.e., based on the command written to the register 83 is any of the commands as described above with reference to FIG. 6 or any of the commands as described above with reference to FIG. 8. Because, here, the command written to the register 83 is any of the commands as described above with reference to FIG. 8, it is assumed that the command analysis section 142 determines that the data transfer mode is the direct transfer mode.

At step S75, the DMA controller configuration section 143 of the controller 81 configures the DMA controller 84 to the direct transfer mode.

At step S76, the host CPU 91 of the host system 62 transmits information related to the transfer process, such as the address and size of the data to be transferred, etc., to the storage system 61 via the storage I/F 63.

At step S77, the storage system 61 acquires the information related to the transfer process from the host system 62 via the storage I/F 63, and holds the acquired information in the register 83.

At step S78 and step S79, the storage system 61 and the host system 62 execute the data transfer process.

Specifically, in the case where the data transfer mode is the direct transfer mode, the host CPU 91 of the host system 62 directly writes the data transfer information, such as the data size and address, to the register 83; therefore, the DMA controller 84 refers to the register 83 to execute the data transfer process.

For example, in the case where the host system 62 reads the data from the storage system 61, the controller 81 controls the storage memory controller 87 to transfer the data to be read from the storage memory 88 to the buffer memory 85. When the content of the data stored in the buffer memory 85 has become effective, the DMA controller 84 starts transferring the data stored in the buffer memory 85 to the host memory 92 via the storage I/F bus 86 and the storage I/F 63, so that the data is transferred to the host memory 92.

At step S80, the command execution section 144 of the controller 81 of the storage system 61 finishes the procedure.

The data transfer in the direct transfer mode is performed in accordance with the above procedure.

As described above, the storage system accommodates the transfer methods of both the link list transfer mode and the direct transfer mode, and the two types of simple command sets are prepared so that a proper one of the transfer methods may be applied. This enables the transmission or reception of the data to or from the host system that has, as occasion demands, either type of command set. Thus, proper data transfer is possible regardless of the system configuration of the host device connected to the storage system, and improvement in data transfer performance (i.e., throughput) is achieved.

Further, according to the above-described embodiment, the data transfer using the widespread high-speed bus, such as the PCI Express bus, is achieved without using any dedicated interface.

Note that in the above-described embodiment, the transfer mode in which the data transfer is performed is selected from the two transfer modes. However, the present invention is also applicable to the case where more than two transfer modes are prepared beforehand depending on the configuration or condition of the host system, for example, so that one of the transfer modes may be applied when performing the data transfer.

The above-described series of processes may be implemented by software. In this case, a program that constitutes the software and which is stored in a storage medium is installed into a computer having a dedicated hardware configuration or, for example, a general-purpose personal computer that, when various programs are installed therein, becomes capable of performing various functions.

Referring to FIG. 4, this storage medium is constituted by the removable medium 101 or the like, which has stored therein the program and is delivered separately from the computer for providing the program to the user. Examples of the removable medium 101 include a magnetic disk (including a flexible disk), an optical disk (including a CD-ROM (Compact Disk-Read Only Memory) and a DVD (Digital Versatile Disk)), a magneto-optical disk (including an MD (Mini-Disk) (a registered trademark)), and a semiconductor memory.

Note that the steps implemented by the program stored in the storage medium and described in the present specification may naturally be performed chronologically in order of description but do not have to be performed chronologically. Some steps may be performed in parallel or independently of one another.

It should be understood by those skilled in the art that various modifications, combinations, sub-combinations and alterations may occur depending on design requirements and other factors insofar as they are within the scope of the appended claims or the equivalents thereof.

What is claimed is:

1. A memory device comprising:
a first memory means;
a command analysis means for analyzing at least one command from an information processing device having a second memory means and for determining whether the command should be executed by a first data transfer mode directly addressing a physical address of the second memory means or a second data transfer mode indirectly addressing a physical address of the second memory means;
an information transfer control means for controlling information transfer between the first memory means and the second memory means based on the determination of the command analysis means, and further wherein in the direct transfer mode a host system directly writes transfer information to a register of the memory device and when data is transferred indirectly, the host system writes an address at which a linked list is stored in the register of the memory device, wherein the first data transfer mode is used to provide information to said information processing device if a physical space in the second memory is successive and the second data transfer mode is used to transfer information to the information processing device if the physical space in the second memory means is not successive.

2. A memory device as claimed in claim 1 wherein the second data transfer mode is a data transfer mode that addresses a physical address of the second memory means having a list comprising a plurality of descriptors having physical addresses of the second memory means for data transfer.

3. A memory device as claimed in claim 1, comprising:
a first register;
a second register,
wherein the first data transfer mode is a data transfer mode for setting a physical address of the second memory means to a first register by the information processing device, and the second data transfer mode is a data transfer mode for setting a physical address of the second memory means to a second register.

4. A memory device as claimed in claim 1, wherein a command set is analyzed by the command analysis means comprising a first command set having a command for said first data transfer mode and a second command set having a second command for a second data transfer mode.

5. A memory device as claimed in claim 4, wherein a plurality of commands are in both a portion of the first command set and a portion of the second command set.

6. A memory device as claimed in claim 1, wherein a command for the first data transfer mode and a command for the second data transfer mode are different commands.

7. A data transfer method comprising:
analyzing at least one command provided by an information processing apparatus;
determining whether the command should be executed by a first data transfer mode directly addressing a physical address of a second memory means that is engaged in information transfer or a second data transfer mode indirectly addressing a physical address of a second memory means; and
controlling information transfer between the first memory and the second memory based on analysis of the command, and further wherein in the direct transfer mode the information processing apparatus directly writes transfer information to a register of the memory device and when data is transferred indirectly, the information processing apparatus writes an address at which a linked list is stored in the register of the memory device, wherein the first data transfer mode is used to provide information to said information processing device if a physical space in the second memory is successive and the second data transfer mode is used to transfer information to the information processing device if the physical space in the second memory means is not successive.

8. A data transfer system comprising:

a first memory means;

a command analysis means for analyzing at least one command from an information processing device having a second memory means and for determining whether the command should be executed by a first data transfer mode directly addressing a physical address a second memory means engaged in an information transfer or a second data transfer mode indirectly addressing a physical address, and further wherein in the direct transfer mode the information processing apparatus directly writes transfer information to a register of the memory device and when data is transferred indirectly, the information processing apparatus writes an address at which a linked list is stored in the register of the memory device, wherein the first data transfer mode is used to provide information to said information processing device if a physical space in the second memory is successive and the second data transfer mode is used to transfer information to the information processing device if the physical space in the second memory means is not successive.

9. A data processing device comprising:

a second memory means having stored therein commands for a first data transfer mode directly addressing a physical address or a second data transfer mode indirectly addressing the memory; and a command transfer means for transferring a command for the first data transfer mode or the second data transfer mode based on analysis of which data transfer mode should be executed, and further wherein the analysis of which data transfer mode should be executed occurs between the first memory and the second memory, and further wherein in the direct transfer mode the data processing device directly writes transfer information to a register and when data is transferred indirectly, the data processing device writes an address at which a linked list is stored in the register, wherein the second data transfer mode is a data transferring mode for addressing the second memory having a list comprising a plurality of descriptors having physical addresses of the second memory, and further wherein the first data transfer mode is used to transfer information to the data processing apparatus if a physical space in the second data processing memory is successive and the second data transfer mode is used to transfer information to the data processing apparatus if the physical space in the second memory is not successive.

10. The data processing device of claim 9, wherein the first data transfer mode sets a physical address of the second memory to a first register of the memory device and the second data transfer mode sets a physical address of the second memory to a second register.

\* \* \* \* \*